US008388456B2

(12) United States Patent  
Yamazaki et al.

(10) Patent No.: US 8,388,456 B2  
(45) Date of Patent: Mar. 5, 2013

(54) FIXED-TYPE, CONSTANT-VELOCITY UNIVERSAL JOINT

(75) Inventors: Kisao Yamazaki, Iwata (JP); Masazumi Kobayashi, Iwata (JP)

(73) Assignee: NTN Corporation, Osaka (JP)

( * ) Notice: Subject to any disclaimer, the term of this patent is extended or adjusted under 35 U.S.C. 154(b) by 54 days.

(21) Appl. No.: 12/990,988

(22) PCT Filed: May 1, 2009

(86) PCT No.: PCT/JP2009/058582
§ 371 (c)(1),
(2), (4) Date: Nov. 4, 2010

(87) PCT Pub. No.: WO2009/145034
PCT Pub. Date: Dec. 3, 2009

(65) Prior Publication Data
US 2011/0059804 A1 Mar. 10, 2011

(30) Foreign Application Priority Data

May 30, 2008 (JP) ................................. 2008-142393

(51) Int. Cl.
*F16D 3/224* (2011.01)
(52) U.S. Cl. ......................................... 464/145; 464/906
(58) Field of Classification Search .................. 464/144, 464/145, 146, 906
See application file for complete search history.

(56) References Cited

U.S. PATENT DOCUMENTS

| 4,358,282 | A * | 11/1982 | Yamamoto | 464/145 |
| 6,135,891 | A * | 10/2000 | Sone et al. | 464/145 |
| 6,224,490 | B1 * | 5/2001 | Iihara et al. | 464/145 |
| 6,267,682 | B1 * | 7/2001 | Sone et al. | |
| 6,796,906 | B2 * | 9/2004 | Cermak | 464/145 |
| 7,637,819 | B2 * | 12/2009 | Feichter et al. | 464/146 |
| 8,029,374 | B2 * | 10/2011 | Fujio et al. | 464/145 |
| 2003/0017877 | A1 * | 1/2003 | Kobayashi et al. | 464/145 |

FOREIGN PATENT DOCUMENTS

| JP | 7-25458 | 9/1991 |
| JP | 6-24237 | 3/1994 |
| JP | 2002-310181 | 10/2002 |

(Continued)

OTHER PUBLICATIONS

International Search Report issued Aug. 11, 2009 in International (PCT) Application No. PCT/JP2009/058582.
International Preliminary Report on Patentability and Written Opinion of the International Searching Authority issued Jan. 20, 2011 in International (PCT) Application No. PCT/JP2009/058582.

(Continued)

*Primary Examiner* — Gregory Binda
*Assistant Examiner* — Matthieu Setliff
(74) *Attorney, Agent, or Firm* — Wenderoth, Lind & Ponack, L.L.P.

(57) ABSTRACT

A fixed type constant velocity universal joint has cutout round portions (32) provided at two portions of a ball-contact-point corresponding part on a track inlet end (22a) of each of the track grooves (22) of the outer joint member for reduce biting of balls. The fixed type constant velocity universal joint is capable of achieving reduction of stress generated when balls and edge portions interfere with each other, suppression of chipping of the edge portions, and prolongation of a service life of the joint as a whole. These advantages are achieved even at a time of an unexpected high-angle operation, and in particular even when an angle expected during use of the constant velocity universal joint is exceeded.

20 Claims, 6 Drawing Sheets

FOREIGN PATENT DOCUMENTS

| | | |
|---|---|---|
| JP | 2003-307235 | 10/2003 |
| JP | 2007-78124 | 3/2007 |
| JP | 2008-2625 | 1/2008 |
| JP | 2008-8474 | 1/2008 |
| JP | 2008-057613 | 3/2008 |
| WO | 2007/079762 | 7/2007 |
| WO | 2007/148487 | 12/2007 |

OTHER PUBLICATIONS

Japanese Office Action, with partial English translation, issued Nov. 20, 2012 in corresponding Japanese Patent Application No. 2008-142393.

* cited by examiner

FIXED-TYPE, CONSTANT-VELOCITY UNIVERSAL JOINT

TECHNICAL FIELD

The present invention relates to a fixed type constant velocity universal joint, and more specifically, to a fixed type constant velocity universal joint which is used in a power transmission system for automobiles and various industrial machines and which allows only angular displacement between two shafts on a driving side and a driven side.

BACKGROUND ART

For example, a fixed type constant velocity universal joint can be taken as an example of a constant velocity universal joint used as means for transmitting a rotational force from an engine to wheels of an automobile at a constant velocity. The fixed type constant velocity universal joint has a structure in which two shafts on a driving side and a driven side are coupled to each other and rotational torque can be transmitted at a constant velocity even when the two shafts form an operating angle. Generally, a Birfield type (BJ) constant velocity universal joint and an undercut-free type (UJ) constant velocity universal joint have been widely known as the above-mentioned fixed type constant velocity universal joint.

Further, as illustrated in FIG. 6, the fixed type constant velocity universal joint of the Birfield type (BJ) includes: an outer race 3 having an inner surface 1 in which a plurality of track grooves 2 are equiangularly formed along an axial direction and serving as an outer joint member; an inner race 6 having an outer surface 4 in which a plurality of track grooves 5 are equiangularly formed in pairs with the track grooves 2 of the outer race 3 along the axial direction and serving as an inner joint member; a plurality of balls 7 interposed between the track grooves 2 of the outer race 3 and the track grooves 5 of the inner race 6, for transmitting torque; and a cage 8 interposed between the inner surface 1 of the outer race 3 and the outer surface 4 of the inner race 6, for retaining the balls 7. In the cage 8, a plurality of window portions 9 for housing the balls 7 are arranged along a circumferential direction.

On opening edges (side edges) of each of the track grooves 2 of the outer race 3 and opening edges (side edges) of each of the track grooves 5 of the inner race 6, in order to avoid stress concentration on both the side edges thereof, chamfers 10, 10, 11, and 11 are provided as illustrated in FIGS. 7 and 8.

In some conventional cases, the chamfers are finished so as to have a round shape (Patent Literatures 1 to 3). By finishing of each of the chamfers into a round shape as just described, stress concentration upon application of high torque (upon input of excessive torque from a vehicle) is easily reduced. Further, the round-shaped chamfers are designed to prevent the edges from being chipped when the balls are pressed against the track grooves and climb onto track edges (track-groove side edges) upon the application of high torque. As a result, shortening of a service life is prevented.

Incidentally, as illustrated in FIG. 7, on an opening side of the outer race 3, there is provided an inlet tapered portion 12 functioning as an angle-limitation stopper so that a shaft does not form more than a certain angle when forming an angle. Normally, a track-groove corresponding edge portion 12a on the inlet tapered portion 12 (edge portion on an axial end portion of each of the track grooves) is formed as a sharp edge. However, in order to reduce stress concentration at a high angle, the track-groove corresponding edge portion 12a is chamfered by a machining process in some cases. Further, as illustrated in FIG. 8, an axial edge 13 of each of the track grooves 5 of the inner race 6 is formed in a shape of a sharp edge portion.

CITATION LIST

Patent Literature 1: Japanese Utility Model Application Laid-open No. Hei 06-24237
Patent Literature 2: Japanese Utility Model Examined Publication No. Hei 07-25458
Patent Literature 3: Japanese Patent Application Laid-open No. 2008-2625

SUMMARY OF INVENTION

Technical Problem

When the constant velocity universal joint is exposed to high torque (input of excessive torque from a vehicle), there occurs a phenomenon that the balls 7 climb onto the track-side edge portions of the track grooves 2 and 5, with the result that the balls 7 reach the chamfers 10 and 11 on both the side edges of the tracks. Under the circumstance, conventionally, each of the chamfers 10 and 11 have been formed in a round shape so as to reduce stress concentration, and thus the edge portions of the chamfers 10 and 11 have been prevented from being chipped.

Meanwhile, at the time of an unexpected high-angle operation, in particular, when an angle expected during use of a constant velocity universal joint is exceeded for some reason, the ball 7 moves to the track-groove corresponding edge portion 12a on the inlet tapered portion 12 of the track grooves 2 of the outer race 3 or to the axial edge (edge portion) 13 of each of the track grooves 5 of the inner race 6. As a result, the ball 7 comes into contact with the track-groove corresponding edge portion 12a and the axial edge 13. When high torque is applied in this state, the ball 7 bites into the track-groove corresponding edge portion 12a and the like, with the result that the track-groove corresponding edge portion 12a and the like are chipped. Once an excessively high angle is formed and the track-groove corresponding edge portion 12a and the like are chipped, damage develops from the chipped portions, with the result that a durability life of the joint as a whole is shortened.

In view of the above-mentioned problems, the present invention has been made to provide a fixed type constant velocity universal joint which is capable of achieving the following even at the time of an unexpected high-angle operation, in particular, even when an angle expected during use of a constant velocity universal joint is exceeded: reduction of stress generated when the balls and the edge portions (edge portions on the axial end portions of the track grooves) interfere with each other, suppression of chipping of the edge portions, and prolongation of a service life of the joint as a whole.

Solution to Problem

A first fixed type constant velocity universal joint according to the present invention includes: an outer joint member having an inner surface in which a plurality of track grooves are formed; an inner joint member having an outer surface in which a plurality of track grooves are formed; a plurality of balls interposed between the plurality of track grooves of the outer joint member and the plurality of track grooves of the inner joint member, for transmitting torque; and a retainer for retaining the plurality of balls, in which a cutout round portion is provided at least at a ball-contact-point corresponding part on a track inlet end of each of the plurality of track grooves of the outer joint member.

A second fixed type constant velocity universal joint according to the present invention includes: an outer joint member having an inner surface in which a plurality of track grooves are formed; an inner joint member having an outer surface in which a plurality of track grooves are formed; a plurality of balls interposed between the plurality of track grooves of the outer joint member and the plurality of track grooves of the inner joint member, for transmitting torque; and a retainer for retaining the plurality of balls, in which a cutout round portion is provided at least at a ball-contact-point corresponding part on a track inlet end of each of the plurality of track grooves of the inner joint member.

A third fixed type constant velocity universal joint according to the present invention includes: an outer joint member having an inner surface in which a plurality of track grooves are formed; an inner joint member having an outer surface in which a plurality of track grooves are formed; a plurality of balls interposed between the plurality of track grooves of the outer joint member and the plurality of track grooves of the inner joint member, for transmitting torque; and a retainer for retaining the plurality of balls, in which: a cutout round portion is provided at least at a ball-contact corresponding part on a track inlet end of each of the plurality of track grooves of the outer joint member; and a cutout round portion is provided at least at a ball-contact-point corresponding part on a track inlet end of each of the plurality of track grooves of the inner joint member.

According to the present invention, even at the time of an unexpected high-angle operation, in particular, even when an angle expected during use is exceeded for some reasons and the balls are positioned at axial end portions of the track grooves of the outer joint member and/or the inner joint member, it is possible that the cutout round portion prevents each of the balls from biting into the axial end portions.

The cutout round portion may be finished by cold forging formation, and an entire of each of the plurality of track grooves may be finished by cold forging formation. Further, a tapered portion expanding from an interior side to an inlet side may be provided at an inlet end portion of the outer joint member, the tapered portion being finished by the cold forging formation, and the cutout round portion may be finished by a cutting process. Still further, machining allowance may be provided with respect to a grinding process of the plurality of track grooves, and the cutout round portion may be secured as a cold-forging finished portion even after the grinding process of the plurality of track grooves.

It is preferred that a PCD clearance representing a difference between a pitch circle diameter of each of the plurality of track grooves of the outer joint member and a pitch circle diameter of each of the plurality of track grooves of the inner joint member be set to range from −0.02 mm to +0.3 mm. With this setting, backlash between components including the outer joint member, the inner joint member, the balls, and the retainer (cage) can be suppressed to the minimum. Note that, when the PCD clearance is less than −0.02 mm, it is difficult to secure operability of the constant velocity universal joint. In contrast, when the PCD clearance is more than +0.3 mm, the backlash between the components becomes larger.

Advantageous Effects of Invention

According to the constant velocity universal joint of the present invention, even when the balls are positioned at the axial end portions of the track grooves of the outer joint member and/or the inner joint member at the time of an unexpected high-angle operation and the like, it is possible that the cutout round portion prevents each of the balls from biting into the axial end portions. That is, even in such a case, it is possible to reduce stress generated when the ball and the edge portions (edge portions on the axial end portions) of the track grooves interfere with each other, to thereby reduce a chipping risk of the edge portions. As a result, a service life of the constant velocity universal joint as a whole can be prolonged.

The cutout round portion can be finished by cold forging formation, a cutting process, or the like, and hence formation thereof does not involve complication. In particular, when the track grooves, the cutout round portion, and the inlet tapered portion are finished simultaneously by cold forging, post-processes (turning or ground-finishing after thermal treatment) can be omitted. Therefore, it is possible to achieve reduction of a formation time period and cost reduction.

Further, when the track grooves are finished by a grinding process, it is preferred that machining allowance be provided with respect to the grinding process of the track grooves and the cutout round portion be secured as a cold-forging finished portion even after the grinding process of the track grooves. With this method, the cutout round portion can be reliably formed.

By setting of the PCD clearance to range from −0.02 to +0.3 mm, the backlash between the components can be suppressed to the minimum, and generation of rattling noise can be suppressed at the time of attachment of the constant velocity universal joint to a vehicle.

DETAILED DESCRIPTION OF THE INVENTION

In the following, description is made of the embodiment of the present invention with reference to FIGS. 1 to 5.

Figure 1:
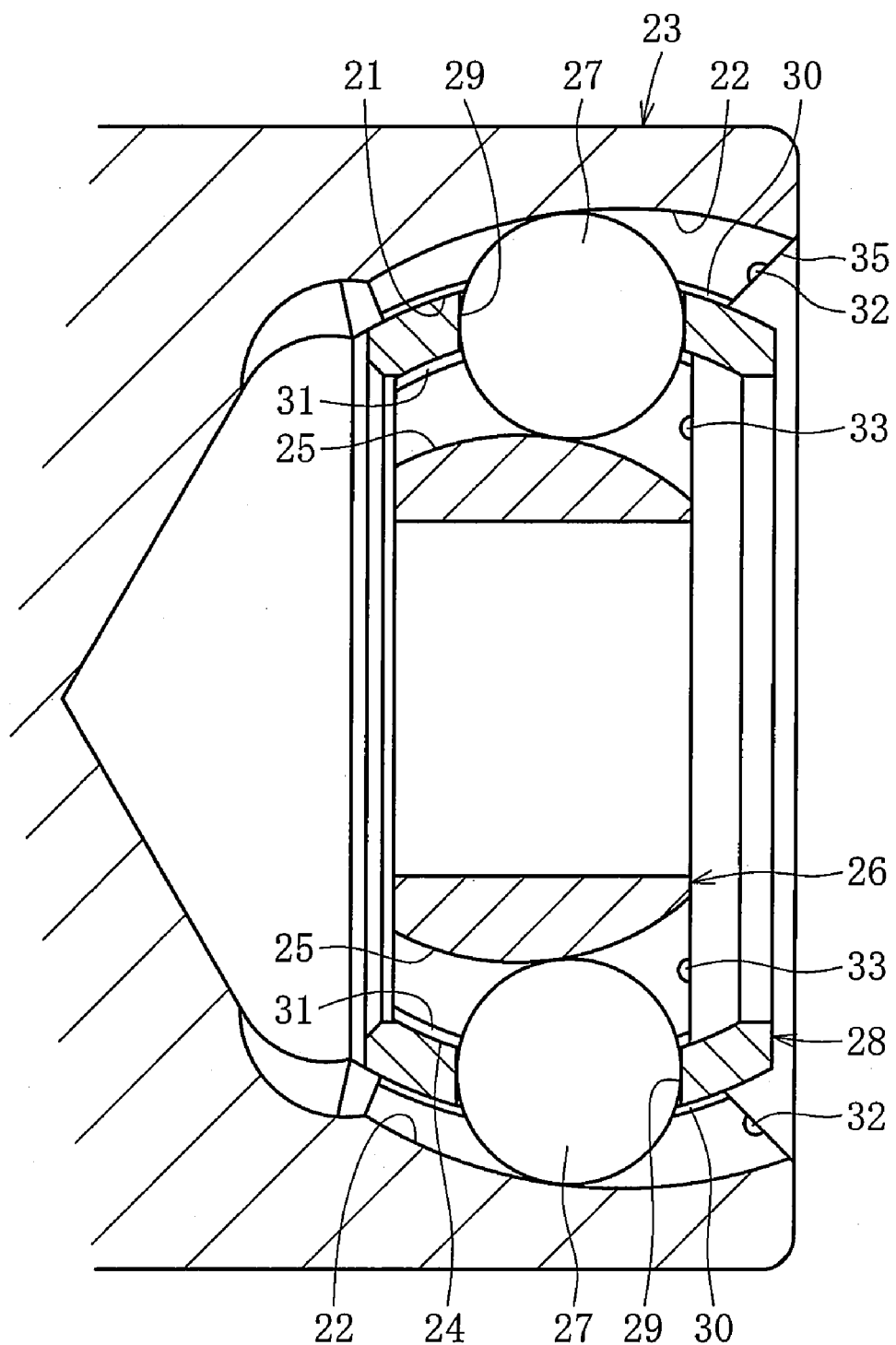
FIG. 1 A sectional view of a fixed type constant velocity universal joint according to an embodiment of the present invention.

A fixed type constant velocity universal joint according to the present invention includes, as illustrated in FIG. 1, an outer race 23 having an inner surface 21 in which a plurality of track grooves 22 are formed along an axial direction and serving as an outer joint member, and an inner race 26 having an outer surface 24 in which a plurality of track grooves 25 are formed along the axial direction and serving as an inner joint member. The track grooves 22 of the outer race 23 and the track grooves 25 of the inner race 26 are provided in pairs, and balls 27 for transmitting torque are interposed between the track grooves 22 of the outer race 23 and the track grooves 25 of the inner race 26. A cage (retainer) 28 is interposed between the inner surface 21 of the outer race 23 and the outer surface 24 of the inner race 26, and the balls 27 are retained in a plurality of window portions (pockets) 29 arranged at a predetermined pitch along a circumferential direction of the retainer 28.

Figure 4:
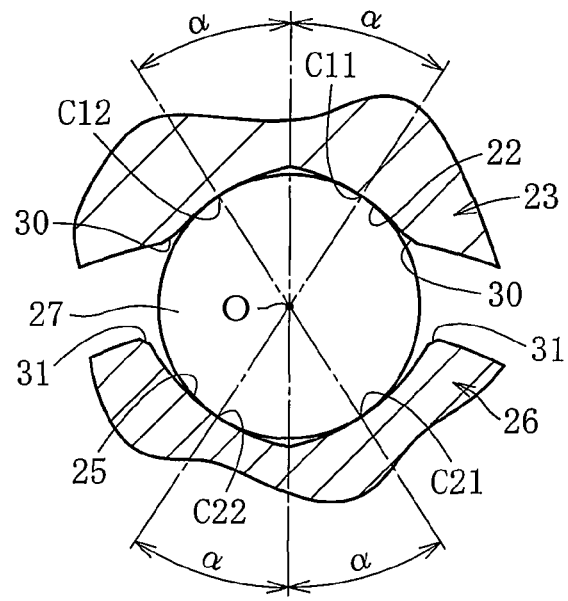
FIG. 4 A sectional view illustrating shapes of track grooves of the fixed type constant velocity universal joint.

The track grooves 22 of the outer race 23 and the track grooves 25 of the inner race 26 have a Gothic-arch shape obtained by only a forging process, or by a cutting process after the forging process, or the like. As illustrated in FIG. 4, by adoption of the Gothic-arch shape, the track grooves 22 and 25 and the ball 27 are held in angular contact with each other. That is, the ball 27 is held in contact with the track groove 22 of the outer race 23 at two points C11 and C12, and in contact with the track groove 25 of the inner race 26 at two points C21 and C22. Angles formed between a center O1 of the ball 27 and each of the contact points C11, C12, C21, and C22 of the track grooves 22 and 25 are contact angles α.

Each of the track grooves 22 of the outer race 23 has chamfers (chamfered portions) 30 and 30 provided on both side edges (groove opening edges) thereof, and each of the track grooves 25 of the inner race 26 has chamfers (chamfered portions) 31 and 31 provided on both side edges (groove opening edges) thereof. Further, an inlet tapered portion 35 expanding from an interior side to an inlet side is provided at an opening end of the outer race 23. The inlet tapered portion 35 functions as an angle-limitation stopper.

Figure 2A:
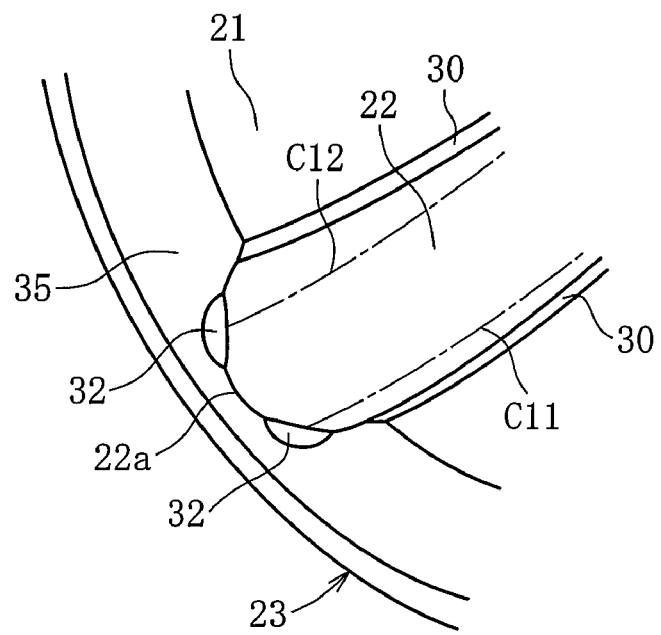
FIG. 2A A perspective view of a main portion, illustrating cutout round portions formed in an outer race of the fixed type constant velocity universal joint, the cutout round portions being provided at a ball-contact-point corresponding part.
Figure 3A:
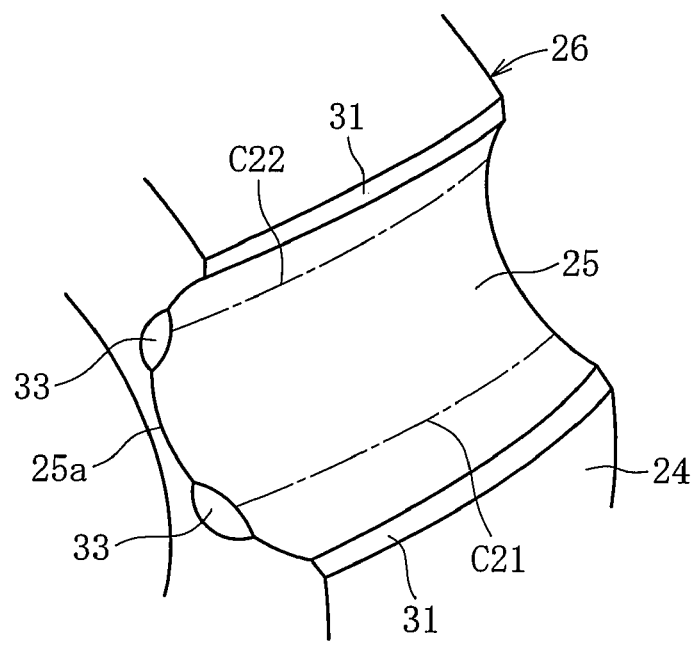
FIG. 3A A perspective view of a main portion, illustrating cutout round portions formed in an inner race of the fixed type constant velocity universal joint, the cutout round portions being provided at the ball-contact-point corresponding part.

As illustrated in FIG. 2A, cutout round portions 32 and 32 are provided at a ball-contact-point corresponding part on a track inlet end 22a of each of the track grooves 22 of the outer race 23. Further, as illustrated in FIG. 3A, cutout round portions 33 and 33 are provided at the ball-contact-point corresponding part on a track inlet end 25a of each of the track grooves 25 of the inner race 26.

Figure 2B:
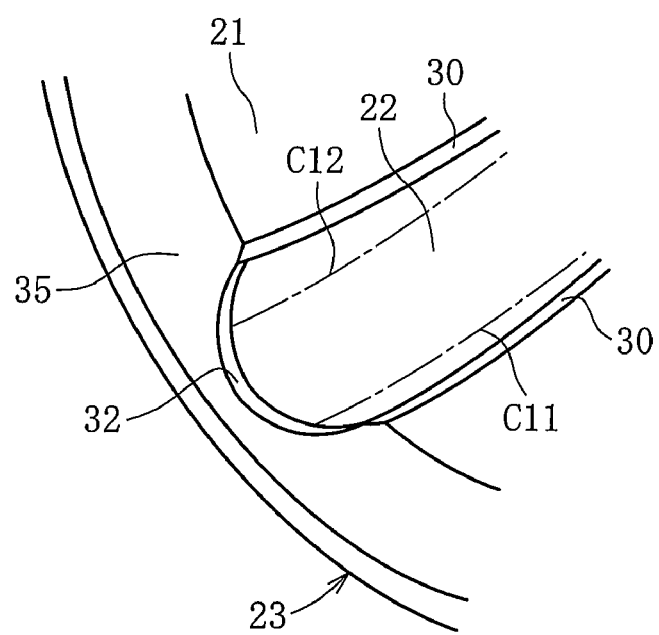
FIG. 2B A perspective view of a main portion, illustrating the cutout round portion formed in the outer race of the fixed type constant velocity universal joint, the cutout round portion being provided over the entire of an axial end portion.
Figure 3B:
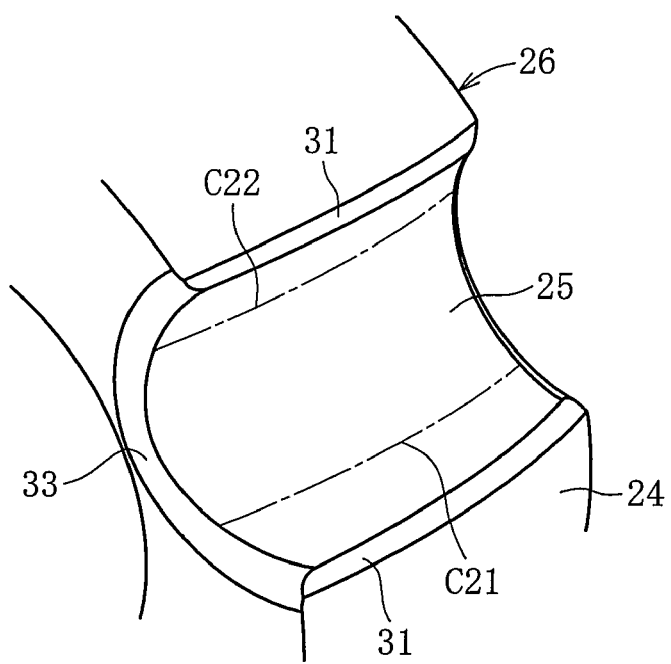
FIG. 3B A perspective view of a main portion, illustrating the cutout round portion formed in the inner race of the fixed type constant velocity universal joint, the cutout round portion being provided over the entire of an axial end portion.

As illustrated in FIG. 2B, the cutout round portion 32 of the outer race 23 may be provided over the entire of the track inlet end 22a. Further, as illustrated in FIG. 3B, the cutout round portion 33 of the inner race 26 may be provided over the entire of the track inlet end 25a as well.

Incidentally, the cutout round portion 32 of the outer race 23 and the cutout round portion 33 of the inner race 26 can be formed by forging simultaneously with other portions at the time of forging. Further, when the track grooves 22 and 25 are formed by only a forging process, or by a cutting process after the forging process, or the like, the cutout round portions 32 and 33 may be formed by processes such as cutting and grinding after the forging.

When the track grooves 22 and 25 are finished by a grinding process after finishing of the cutout round portions 32 and 33 by cold forging, it is preferred to set machining allowance in track-groove grinding portions so that the cutout round portions finished by cold forging after grinding are reliably secured.

Figure 5A:
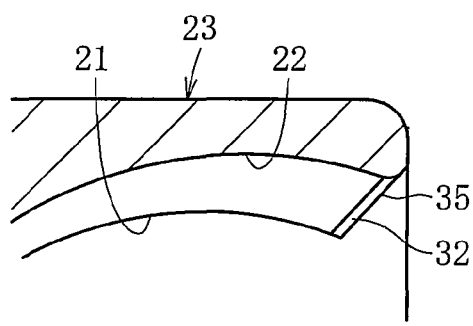
FIG. 5A An enlarged sectional view of a main portion of a finished product, illustrating a forming method for the outer race of the fixed type constant velocity universal joint.
Figure 5B:
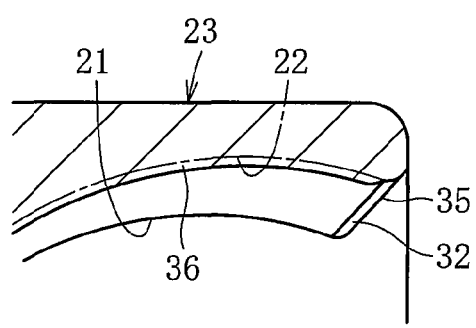
FIG. 5B An enlarged sectional view of a main portion in a state in which machining allowance is provided, illustrating the forming method for the outer race of the fixed type constant velocity universal joint.
Figure 6:
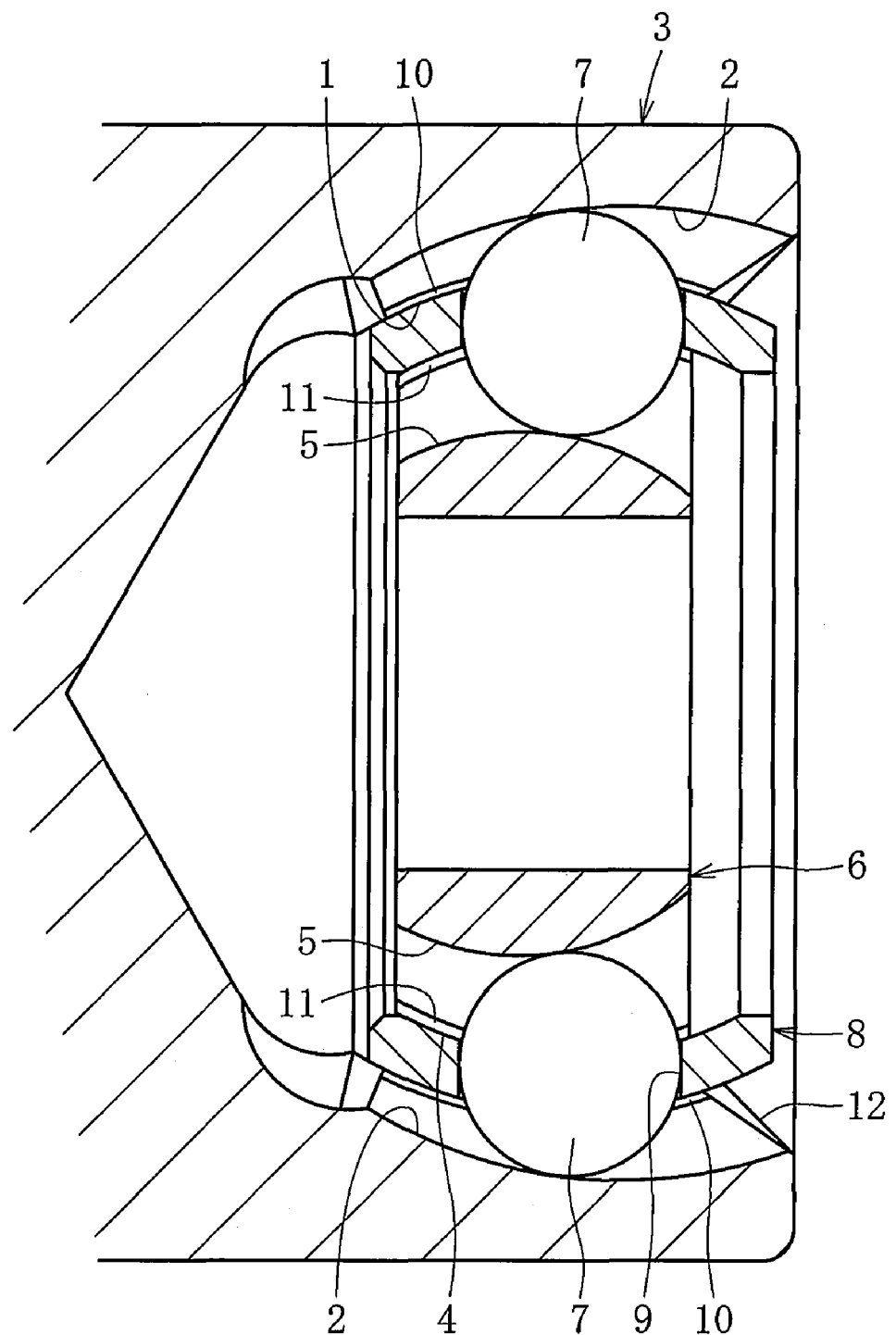
FIG. 6 A sectional view of a conventional fixed type constant velocity universal joint.
Figure 7:
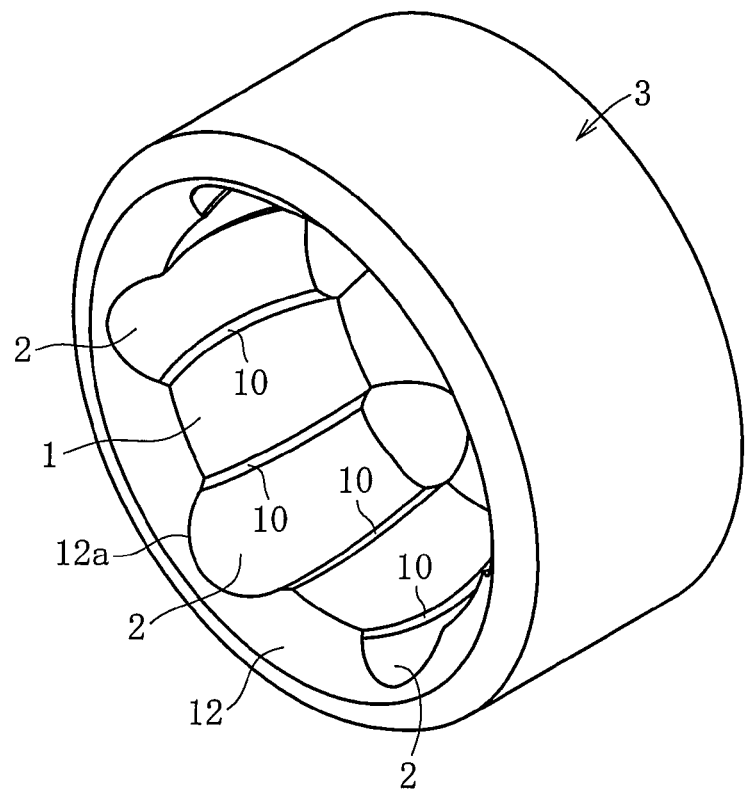
FIG. 7 A schematic perspective view of an outer race of the conventional fixed type constant velocity universal joint.
Figure 8:
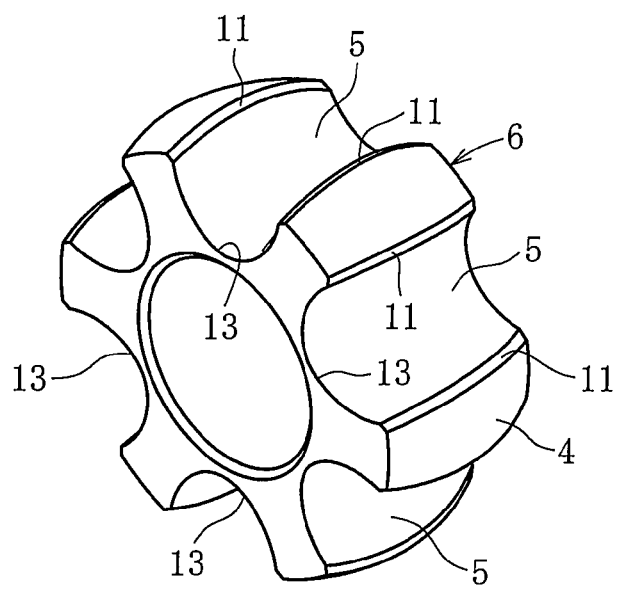
FIG. 8 A schematic perspective view of an inner race of the conventional fixed type constant velocity universal joint.

For example, in a case of the outer race 23 as illustrated in FIG. 5A, when machining allowance 36 is set on the track groove 22 and the machining allowance 36 is removed by a grinding process of the track groove 22 as illustrated in FIG. 5B, the cutout round portion 32 finished by cold forging is not influenced by the grinding process of the track groove 22. As a result, the cutout round portion 32 is capable of maintaining a shape after being finished by the cold forging. Note that, although not shown, on the inner race 26 as well, the machining allowance 36 may be secured in a grinding process of the track groove 25.

Incidentally, in the constant velocity universal joint, a PCD clearance is set to range from −0.02 mm to +0.3 mm. The PCD clearance represents a difference between a pitch circle diameter of each of the track grooves 22 of the outer race 23 and a pitch circle diameter of each of the track grooves 25 of the inner race 26, that is, a difference between a pitch circle diameter of the balls 27 (outer race PCD) in a state in which the balls 27 are held in contact with the track grooves 22 of the outer race 23 and a pitch circle diameter of the balls 27 (inner race PCD) in a state in which the balls 27 are held in contact with the track grooves 25 of the inner race 26. Setting of the PCD clearance to zero or a negative value means closing of the PCD clearance.

Although the cutout round portions 32 and 33 are provided to the outer race 23 and the inner race 26 as described above in this embodiment, as another embodiment, it is possible to use a constant velocity universal joint in which the cutout round portion 32 is provided only to the outer race 23, or possible to use a constant velocity universal joint in which the cutout round portion 33 is provided only to the inner race 26.

Further, although the case where each of the balls 27 and the track grooves 22 and 25 are held in angular contact with each other is described above in this embodiment, in some constant velocity universal joints, each of the balls 27 and the track grooves 22 and 25 are held in circular contact with each other. In the case where such circular contact is made, each of the balls is held in contact at one point with each of the inner race track and the outer race track, and the one contact point moves over the entire of cross-section of each of the track grooves. Thus, as illustrated, for example, in FIGS. 2B and 3B, the movement at the one contact point can be coped with by the cutout round portions 32 and 33 formed over the entire of the track inlet ends 22a and 25a.

In the present invention, at the time of a high-angle operation, when the balls 27 are positioned at axial end portions of the track grooves 22 and 25 of the outer race 23 and/or the inner race 26, the balls 27 are prevented from biting into the axial end portions. That is, it is possible to reduce stress generated when the balls 27 and edge portions (edge portions on the axial end portions) of the track grooves 22 and 25 interfere with each other, to thereby reduce a chipping risk of the edge portions. As a result, a service life of the constant velocity universal joint as a whole can be prolonged.

The cutout round portions 32 and 33 can be finished by cold forging formation, a cutting process, or the like, and hence formation thereof does not involve complication. In particular, when the track grooves 22 and 25, the cutout round portions 32 and 33, and the inlet tapered portion 35 are finished simultaneously by cold forging, post-processes (turning or ground-finishing after thermal treatment) can be omitted. Therefore, it is possible to achieve reduction of a formation time period and cost reduction.

When the track grooves 22 and 25 are finished by a grinding process after finishing of the cutout round portions 32 and 33 by cold forging, it is preferred to set machining allowance in the track-groove grinding portions. When the machining allowance is removed by a grinding process of the track grooves 22 and 25, the cutout round portions 32 and 33 finished by the cold forging are not influenced by the grinding process of the track grooves 22 and 25. As a result, each of the cutout round portions 32 and 33 is capable of maintaining a shape after being finished by the cold forging, and hence the cutout round portions can be formed at low cost.

By setting of the PCD clearance to range from −0.02 to +0.3 mm, backlash between components can be suppressed to the minimum, and generation of rattling noise can be suppressed at the time of attachment of the constant velocity universal joint to a vehicle. That is, by setting the PCD clearance to be small as just described, a phase region free from a load on the ball 27 can be reduced or eliminated. As a result, behavior of the ball 27 can be stabilized until the ball 27 is re-accommodated into the track groove 22 of the outer race 23 after once dropping off the track groove 22. In addition, the behavior of the ball 27 can be stabilized also by reduction or elimination of the phase region free from the load on the ball 27. As a result, it is possible to suppress generation of vibration or abnormal noise.

Hereinabove, although description has been made of the embodiment according to the present invention, the present invention is not limited to the above-mentioned embodiment, and various modification can be made thereto. For example, a size, a curvature radius, and the like of each of the cutout round portions 32 and 33 to be formed can be variously changed as long as problems do not occur, for example, in the following cases: the balls are less liable to bite into the axial end portions, the balls roll, and operating angles are formed. Further, a center curvature of each of the track grooves 22 of the outer race 23 and a center curvature of each of the track grooves 25 of the inner race 26 may be offset in a radial direction (radial offset) relative to a joint axis. Still further, arrangement pitches of the track grooves 22 and 25 in a peripheral direction may be equal pitches or unequal pitches, and the number of the balls, in other words, the number of the track grooves 22 and 25 may be arbitrarily increased and reduced.

INDUSTRIAL APPLICABILITY

As the constant velocity universal joint, one of an undercut-free type may be used, in which track groove bottoms are each provided with a circular-arc portion and a straight portion, or another constant velocity universal joint may be used, which has a shape in which portions corresponding to linear portions of the undercut-free type exhibit tapered shapes. Alternatively, still another constant velocity universal joint may be used, in which track groove bottoms are provided with a plurality of circular-arc portions having curvature radii different from each other.

REFERENCE SIGNS LIST 21 inner surface
22, 25 track groove
22a track inlet end
24 outer surface
25a track inlet end
27 ball
28 retainer
32, 33 cutout round portion
36 machining allowance

The invention claimed is:

1. A fixed type constant velocity universal joint, comprising:
   an outer joint member having an inner surface in which a plurality of track grooves are formed;
   an inner joint member having an outer surface in which a plurality of track grooves are formed;
   a plurality of balls interposed between the plurality of track grooves of the outer joint member and the plurality of track grooves of the inner joint member, for transmitting torque; and
   a retainer for retaining the plurality of balls,
   wherein cutout round portions for reducing biting of the balls are provided at two points on a ball-contact-point corresponding part on a track inlet end of each of the track grooves of the outer joint member, and
   wherein a PCD clearance is set to range from −0.02 mm to +0.3 mm for suppressing backlash between components, the PCD clearance being a difference between a pitch circle diameter of each of the track grooves of the outer joint member and a pitch circle diameter of each of the track grooves of the inner joint member.

2. The fixed type constant velocity universal joint according to claim 1, wherein the cutout round portion is finished by cold forging formation.

3. The fixed type constant velocity universal joint according to claim 2, wherein an entirety of each of the track grooves is finished by cold forging formation.

4. The fixed type constant velocity universal joint according to claim 2, wherein a tapered portion expanding from an interior side to an inlet side is provided at an inlet end portion of the outer joint member, the tapered portion being finished by the cold forging formation.

5. The fixed type constant velocity universal joint according to claim 2, wherein:
   machining allowance is provided with respect to a grinding process of the plurality of track grooves; and
   the cutout round portion is secured as a cold-forging finished portion even after the grinding process of the plurality of track grooves.

6. The fixed type constant velocity universal joint according to claim 1, wherein the cutout round portion is finished by a cutting process.

7. The fixed type constant velocity universal joint according to claim 1, wherein each track groove has a center, and the cutout round portions of each track groove are spaced apart from each other and disposed on opposite sides of the center of the track groove from each other.

8. A fixed type constant velocity universal joint, comprising:
   an outer joint member having an inner surface in which a plurality of track grooves are formed;
   an inner joint member having an outer surface in which a plurality of track grooves are formed;
   a plurality of balls interposed between the plurality of track grooves of the outer joint member and the plurality of track grooves of the inner joint member, for transmitting torque; and
   a retainer for retaining the plurality of balls,
   wherein cutout round portions for reducing biting of the balls are provided at two points on a ball-contact-point corresponding part on a track inlet end of each of the track grooves of the inner joint member, and
   wherein a PCD clearance is set to range from −0.02 mm to +0.3 mm for suppressing backlash between components, the PCD clearance being a difference between a pitch circle diameter of each of the track grooves of the outer joint member and a pitch circle diameter of each of the track grooves of the inner joint member.

9. The fixed type constant velocity universal joint according to claim 8, wherein the cutout round portion is finished by cold forging formation.

10. The fixed type constant velocity universal joint according to claim 9, wherein an entire of each of the track grooves is finished by cold forging formation.

11. The fixed type constant velocity universal joint according to claim 9, wherein a tapered portion expanding from an interior side to an inlet side is provided at an inlet end portion of the outer joint member, the tapered portion being finished by the cold forging formation.

12. The fixed type constant velocity universal joint according to claim 9, wherein:
   machining allowance is provided with respect to a grinding process of the plurality of track grooves; and
   the cutout round portion is secured as a cold-forging finished portion even after the grinding process of the plurality of track grooves.

13. The fixed type constant velocity universal joint according to claim 8, wherein the cutout round portion is finished by a cutting process.

14. The fixed type constant velocity universal joint according to claim 8, wherein each track groove has a center, and the cutout round portions of each track groove are spaced apart from each other and disposed on opposite sides of the center of the track groove from each other.

15. A fixed type constant velocity universal joint, comprising:
   an outer joint member having an inner surface in which a plurality of track grooves are formed;
   an inner joint member having an outer surface in which a plurality of track grooves are formed;
   a plurality of balls interposed between the plurality of track grooves of the outer joint member and the plurality of track grooves of the inner joint member, for transmitting torque; and
   a retainer for retaining the plurality of balls,
   wherein cutout round portions for reducing biting of the balls are provided at two points on a ball-contact-point corresponding part on a track inlet end of each of the track grooves of the inner and outer joint members, and
   wherein a PCD clearance is set to range from −0.02 mm to +0.3 mm for suppressing backlash between components, the PCD clearance being a difference between a pitch circle diameter of each of the track grooves of the outer joint member and a pitch circle diameter of each of the track grooves of the inner joint member.

16. The fixed type constant velocity universal joint according to claim 15, wherein the cutout round portion is finished by cold forging formation.

17. The fixed type constant velocity universal joint according to claim 16, wherein an entire of each of the track grooves is finished by cold forging formation.

18. The fixed type constant velocity universal joint according to claim 16, wherein a tapered portion expanding from an interior side to an inlet side is provided at an inlet end portion of the outer joint member, the tapered portion being finished by the cold forging formation.

19. The fixed type constant velocity universal joint according to claim 15, wherein the cutout round portion is finished by a cutting process.

20. The fixed type constant velocity universal joint according to claim 15, wherein each track groove has a center, and the cutout round portions of each track groove are spaced apart from each other and disposed on opposite sides of the center of the track groove from each other.

* * * * *